United States Patent [19]
Petrow et al.

[11] 3,960,989
[45] June 1, 1976

[54] COLLOIDAL SOL ANTIMONY PENTAOXIDE FLAMEPROOFING COMPOSITIONS

[76] Inventors: Henry G. Petrow, 33 Concord Ave., Cambridge, Mass. 02138; Robert J. Allen, 130 Adams Ave., Saugus, Mass. 01906

[22] Filed: Nov. 21, 1974

[21] Appl. No.: 526,058

Related U.S. Application Data

[62] Division of Ser. No. 212,375, Dec. 27, 1971, Pat. No. 3,860,523.

[52] U.S. Cl. .................................. 260/884; 252/8.1; 260/45.75 B
[51] Int. Cl.² .............................................. C08J 3/20

[58] Field of Search .................... 260/45.75 B, 884; 252/8.1

[56] References Cited
UNITED STATES PATENTS

| | | | |
|---|---|---|---|
| 3,676,362 | 7/1972 | Yates | 260/45.75 B |
| 3,766,065 | 10/1973 | Chay et al. | 260/45.75 B |

*Primary Examiner*—V. P. Hoke
*Attorney, Agent, or Firm*—Rines and Rines

[57] ABSTRACT

This disclosure deals with novel antimony oxide colloidal sols and formulations of the same containing halogens that provide a vastly improved fire-retarding quality to textiles, plastics and other materials to which the compounds are applied.

6 Claims, 1 Drawing Figure

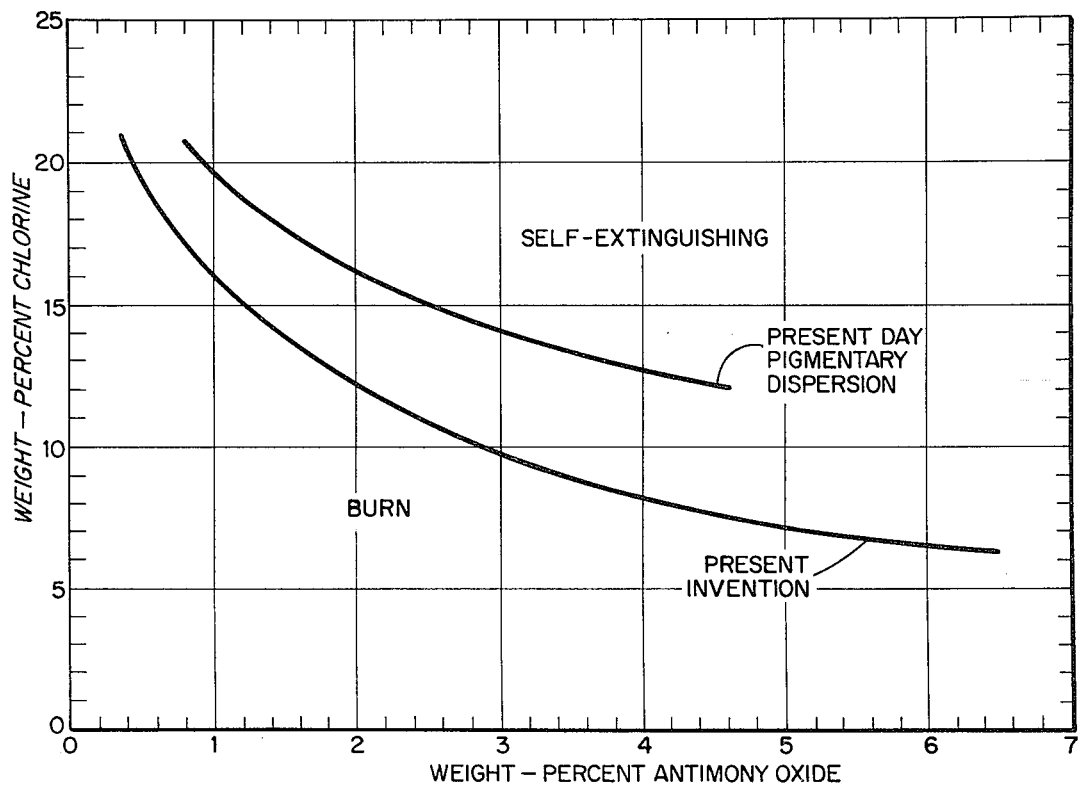

COLLOIDAL SOL ANTIMONY PENTAOXIDE FLAMEPROOFING COMPOSITIONS

This is a divisional application of Ser. No. 212,375, filed Dec. 27, 1971, now U.S. Pat. No. 3,860,523 granted Jan. 14, 1975.

The present invention relates to flame-retardant compounds of the antimony oxide variety, being more particularly directed to novel antimony oxide colloidal sols and formulations and processes for making the same.

For many years, antimony oxide has been used in conjunction with organic chlorides, bromides and other halogen-containing materials as a coating for fabrics, textiles, plastics and the like for rendering the same flame retarding. Such compounds are described, for example, in "The Chemistry and Uses of Fire Retardants" by Lyons, J. W. Wiley — Interscience, New York, 1970, p. 17, 18, 21, 79. While the reasons for the resulting flame-retardant properties are not fully understood, one school of thought is that an antimony oxide halogen compound may be generated in situ, which interrupts oxidizing reactions and thus inhibit the flame. In any event, the prior art has principally involved antimony oxide in the form of $Sb_2O_3$ and in pigmentary particle size, generally of the order of ½ to 1 micron— the smallest sizes heretofore commercially feasible from the various vaporizing, precipitating, and other processes used in the art.

While these prior antimony oxide compounds have been widely used, they are subject to rather serious deficiencies and drawbacks which have just had to be tolerated. Specifically, the particle size of the pigmentary antimony oxide inherently has produced somewhat of a stiffening effect and loss of the desired feel in the fabric or other material being flameproofed. It has been found, moreover, that the pigmenting characteristics of these pigment-size particles often impair the color of the dyed fabric; or, when cast, as in films, plastics and resins, producing a milky rather than a clear cast. Binders are required additionally to prevent dusting or appreciable loss during washing cycles, since there is little or no intrinsic cohesion between antimony oxide particles of this size range and many fabrics. A further problem inherent in the relatively large pigment particles resides in the fact that the medium being treated acts as a filter, so that surface coating rather than total impregnation is obtained. In the application process, moreover, careful procedures must be followed to try to insure uniform distribution and to prevent stratification or settling of the various agents involved at different locations.

In accordance with the present invention, on the other hand, it has been discovered that antimony oxide may be prepared in commercial quantities in very much smaller particle size and in a colloidal sol form that remarkably obviates every one of the above-described difficulties and, in addition, does so with greater efficiency, enabling the quantity of antimony required for a predetermined degree of flame-retarding to be substantially reduced below that required by pigment-grade particles.

An object of the invention, accordingly, is to provide a new and improved antimony oxide fire retardant in the form of a colloidal sol, and a novel method of preparing the same.

A further object is to provide a novel antimony oxide halogen-containing formulation for flame-retarding and similar purposes.

Still a further object is to provide a novel antimony oxide flame retardant of more general application, as well.

Other and further objects will be explained hereinafter and are more particularly pointed out in the appended claims.

In summary, from one of its broader aspects, the invention contemplates a colloidal antimony oxide sol, preferably in the $Sb_2O_5$ form and of average particle size of the order of 20 Angstroms or somewhat greater, particularly suited for use with organic halogens such as polyvinylidene chloride, polyvinyl chloride, or mixtures or copolymers of the same and other chlorinated materials, such as "chlorowax" and the like.

The invention will now be described with reference to the accompanying drawing the single FIGURE of which is a graph plotting weight percentages of halogen and antimony oxide along the ordinate and abscissa, respectively, and illustrating the markedly improved efficiency of the present invention over present-day pigment type fire retardants of this character.

The test procedure used to determine the plotted data was as follows. Antimony oxide in polyvinylidene chloride emulsions of known composition was applied to a weighed filter paper. The filter paper was then dried and reweighed. The thusly treated filter paper was held vertically in a blue bunsen burner flame for two seconds, and, while the paper was still held vertically, the flame removed. When the flame extinguished before total consumption of the test paper, the remaining paper was weighed. If the weight loss was found to be less than 25 percent, the formulation was said to be self-extinguishing. The two lines plotted in the graph of the drawing represent the self-extinguishing lines, the upper line being that determined using Harshaw pigment grade aqueous dispersion of $Sb_2O_3$, and the lower line, the colloidal antimony oxide of the present invention. Any point falling below either line represents a region of non-extinguishing; whereas any point on or above either line represents a self-extinguishing state. Observation of the graphs indicates the colloidal antimony oxide sol of the invention to be at least twice as effective as pigment-grade antimony oxide.

When applied in film form, furthermore, the colloidal sol of the invention provides remarkable clarity, as distinguished from the pigmentary dispersion. Mixtures identical with those used in connection with the flame retardance graph, above, were used to prepare films in the following manner in order to measure relative transparencies. One-tenth milliliter of each mixture was uniformly spread over a circular area 1½ inches in diameter on black paper. In addition to the two samples containing equal amounts of antimony oxide, a film containing only polyvinylidene chloride (Daran 228) was prepared and relative reflectance measurements to the black paper were obtained on a General Electric Recording Spectrophotometer. At 550 nanometers the relative light reflectances were 5.9% black paper, 6.75% Daran only, 11.5% colloidal antimony oxide plus Daran, and 18.75% pigmentary antimony oxide plus Daran. This clearly illustrates the improved clarity (approximately 100 percent) of films containing colloidal antimony oxide over those with pigmentary antimony oxide.

It now remains to explain the details of the highly improved antimony oxide flame retardant of the present invention that gives use to these novel results and its preferred method of preparation.

In accordance with the invention, colloidal particulate $Sb_2O_5$ is employed, preferably of average particle diameter of about 20 Angstroms, though particle sizes up to 50 times that value, (1/10 micron) have still been found to produce some improved results. While it is not intended to be bound by any theories, it being sufficient to describe the invention as it has been found to work in practice, it appears that the greatly improved results of the invention may be obtained because of the much greater surface area exposed by these colloidal particles. It has been found possible, indeed, to vary the halogen-antimony ratios from values that are predominantly antimony (such as 1–4), to ratios that are predominantly halogen (such as 20–1). While different formulation values are therefore involved, adequate flame protection can be achieved up to these values. The extremes are more particularly illustrated in the graph; and, in fact, in circumstances where the nature of the material being protected is such that no halogen carrier at all need be added, increased efficacy of the colloidal antimony oxide of the invention is still noted.

A preferred method or process for preparing this novel colloidal sol will now be described, treating first with the manner in which the antimony compound is rendered colloidal for these purposes, and then discussing the variations of the suitable antimony compounds.

A solution of potassium antimonate, believed to be principally dissolved $KSbO_3$, containing approximately 2% by weight of antimony oxide, expressed as $Sb_2O_3$, is passed through a hydrogen form cation exchange resin, such as "Amberlite + 120" (Rohm and Haas) or "Dowex-50" (Dow Chemical Company), whereby potassium ions are exchanged for hydrogen ions to yield the insoluble antimony oxide $Sb_2O_5$ (or insoluble antimonic acid). The resulting water-clear material has a pH of the order of 1.5. It can be concentrated by evaporation to as much as 75% antimony oxide by eight. During this process, the colloid takes on an opalescent cast due both to particle-size growth and to the agglomeration of small particles of the order of 20 Angstroms, yielding larger agglomerates which still retain the essential surface area, estimated by measuring the conductometric titration of the amount of surface-absorbed hydrogen ions. Because of the fact that the resulting material is acidic, it is not applicable to many fabrics such as cotton, because these materials tend to lose their strength in the presence of hydrogen ions below approximately pH 4. An unexpected and most fortunate property of the colloid of the invention, however, is that its pH can be increased to as much as 10, if so desired, by the addition of ammonia, and presumably other bases, without adversely affecting the colloidal properties of the material. This was an unexpected result since the general property of acidic colloids is that the addition of electrolytes or drastic alteration of pH brings about instability and coagulation. The colloidal material of the invention, however, can be provided over a pH range of 1½-to-10 with the choice of pH being left to what is most appropriate for the chosen application.

In a typical application, a pH of 5 has been employed for the case of cotton or paper mixed with the desired amount of colloidal polyvinylidene chloride, such as Daran (W. R. Grace Company). The two materials are completely compatible, and when absorbed on paper or a fabric, give an extremely adherent film not easily dislodged either mechanically or by washing. It is not a requirement that the Daran be present to provide this adherence, however, since the applied colloid alone is strongly adherent, exhibiting no evidence of dusting and no loss of the absorbed antimony oxide upon washing. Furthermore, the antimony oxide in itself does not affect the pliability or the feel or the shape of paper or fabric containing as much as 40% by weight of the colloidal antimony oxide.

It now remains to explain how the appropriate antimony oxide is prepared in preferred form.

It is well known that $Sb_2O_5$ can be dissolved in concentrated potassium hydroxide. This, however, is a slow and laborious dissolution, requiring very large excess of potassium hydroxide in a very concentrated form. A fusion is the preferred mode of dissolution of $Sb_2O_5$. The resulting large excess of KOH required however, is costly, not only in its own right, but in the subsequent deionization stage, requiring a large amount of cation resin for a given yield of colloidal antimony oxide. It has been found that if antimony oxide ($Sb_2O_3$), potassium hydroxide and hydrogen peroxide in the ratio of 1 mol of $Sb_2O_3$, 2.1 mols KOH, and 2 mols $H_2O_2$ are mixed, a vigorous dissolution of the $Sb_2O_3$ results, and a clear solution of potassium antimonate is obtained. In practice, potassium hydroxide and antimony trioxide are mixed in sufficient water such that the antimony trioxide is about 30% by weight. This is then heated with vigorous stirring to about 70°C. The hydrogen peroxide is then slowly and carefully added while the mixing is continued. This cautious addition is necessary because the reaction is rapidly vigorous and extremely exothermic. To effect dissolution, only the stoichiometric amount of hydrogen peroxide is required to oxidize the antimony in the 3-state to the 5-state, and only 5 percent excess of potassium hydroxide over that required to yield one mole of potassium per mol of antimony is needed. In fact, it is undesirable to use more than the required amount of hydrogen peroxide since it is more acidic than water, tends to lower the pH of the solution, and causes some precipitation of hydrous antimonic oxide which can then only be dissolved by subsequent heating, so as to decompose the excess hydrogen peroxide unnecessarily added.

A slight excess of KOH is used so as to maintain the solution on the alkaline side, even at the termination of the reaction, and render suitability to the material to deionization should it be desired to store it for periods of time. Solutions containing as much as 40% by weight, expressed as $Sb_2O_3$, prepared by this reaction have indeed been stored for extended periods of time. While it cannot be stated categorically that the material formed by this reaction is $KSbO_3$, it certainly is not the well-known $KSb(OH)_6$ one might expect, since the solubility of this material far exceeds the 20 grams per liter figure known for $KSb(OH)_6$.

The following reaction is thus presented as probably correct for the preparation of the potassium antimonate solution:

$$Sb_2O_3 + 2KOH + 2H_2O_2 \rightarrow 2KSbO_3 + 3 H_2O.$$

The novel antimony oxide colloidal formulations and process of preparation can thus be attained within the limits and ranges above-specified. While the colloidal $Sb_2O_5$ has been described as combined with chlorine, other halogens are also useful such as bromine as contained in polyvinyl bromide, tris (2, 3 dibromopropyl) phosphate, tetrabromo-phthalic anhydride, and similar inorganic or organic compounds.

Further modifications will also occur to those skilled in this art and all such are to be considered to fall within the spirit and scope of the invention as defined in the following claims.

What is claimed is:

1. A flame retardant comprising a colloidal sol of $Sb_2O_5$ having colloidal particle size ranging from substantially 20 Angstroms to 1/10 micron and in which an effective amount of a halogen is added.

2. A flame-retardant as claimed in claim 1 and in which the ratio of halogen-to-antimony lies within the range of from substantially 1–4 to 20–1.

3. A flame-retardant as claimed in claim 2 and in which the halogen is chlorine.

4. A flame-retardant as claimed in claim 3 and in which the chlorine is contained in a compound selected from the group consisting of polyvinyl chloride, polyvinylidene chloride, and copolymers and mixtures of the same.

5. A flame-retardant as claimed in claim 2 and in which the halogen is bromine.

6. A flame retardant as claimed in claim 2 to which has been added base sufficient to adjust the pH to the range of from substantially 1.5 to 10, the base-added sol being concentrated from the order of 2% by weight of solvents to up to 75 percent.

* * * * *